(12) United States Patent
Jansen et al.

(10) Patent No.: US 8,003,029 B2
(45) Date of Patent: Aug. 23, 2011

(54) METHOD FOR PREVENTING DEPOSIT FORMING ON GUIDE ROLLERS

(75) Inventors: Hans Jansen, Velp (NL); Stephanus Willemsen, Rheden (NL)

(73) Assignee: Teijin Aramid B.V., Arnhem (NL)

( * ) Notice: Subject to any disclaimer, the term of this patent is extended or adjusted under 35 U.S.C. 154(b) by 72 days.

(21) Appl. No.: 12/450,037

(22) PCT Filed: Mar. 22, 2008

(86) PCT No.: PCT/EP2008/002312
§ 371 (c)(1),
(2), (4) Date: Sep. 9, 2009

(87) PCT Pub. No.: WO2008/116619
PCT Pub. Date: Oct. 2, 2008

(65) Prior Publication Data
US 2010/0089018 A1      Apr. 15, 2010

(30) Foreign Application Priority Data

Mar. 27, 2007   (EP) .................................... 07006201

(51) Int. Cl.
*B05D 3/02* (2006.01)
*D02G 3/00* (2006.01)
*D06M 13/02* (2006.01)

(52) U.S. Cl. ................ 264/130; 264/211.14; 427/389.7; 427/393.5

(58) Field of Classification Search .................. 264/129, 264/130, 211.14; 427/389.7, 389.9, 393.5
See application file for complete search history.

(56) References Cited

U.S. PATENT DOCUMENTS

| 5,342,686 A * | 8/1994 | Guersen et al. ............... 428/328 |
| 2003/0124350 A1 * | 7/2003 | Rebouillat et al. ............ 428/375 |
| 2004/0214961 A1 * | 10/2004 | Gartner et al. ......... 427/393.5 X |

FOREIGN PATENT DOCUMENTS

| EP | 0 351 100 A2 | 1/1990 |
| EP | 0 779 389 A2 | 6/1997 |
| EP | 0 784 116 A2 | 7/1997 |
| WO | WO 99/10591 A1 | 3/1999 |
| WO | WO 00/31752 A2 | 6/2000 |

OTHER PUBLICATIONS

"Absorbency," *Textile Science and Technology 7*, ed. By Pronoy K. Chatterjee, 1985, pp. 198-203.

* cited by examiner

*Primary Examiner* — Leo B Tentoni
(74) *Attorney, Agent, or Firm* — Oliff & Berridge, PLC

(57) ABSTRACT

The invention relates to a method for preventing or reducing deposit forming of superabsorbent material and/or oil onto guide rollers during the process of applying a superabsorbent water-in-oil emulsion onto a yarn wherein the oil is a mixture comprising saturated hydrocarbons, characterized in that the at least 70 wt % of the hydrocarbons have 20 to 32 carbon atoms.

18 Claims, No Drawings

METHOD FOR PREVENTING DEPOSIT FORMING ON GUIDE ROLLERS

The invention pertains to a method for preventing or reducing deposit forming of superabsorbent material and/or oil onto guide rollers during the process of applying a superabsorbent water-in-oil emulsion onto a yarn wherein the oil is a mixture comprising saturated aliphatic hydrocarbons.

The application of superabsorbent materials was disclosed in EP 779389 for aramid yarns and in EP 0784116 for other multifilament yarns. The method described therein comprises applying to the surface of the yarn a layer of a water-in-oil emulsion which contains the superabsorbent material in its aqueous phase. This method proved to be the method of choice for commercial production of superabsorbent yarn. This method however has as its drawback a high cost price, due to the fact that the water-in-oil emulsion contains high amounts of water, usually 25 to 40% by weight, which necessitates a drying step after the application of the superabsorbent material. Using other emulsions containing much less water were tried without success, because it appeared impossible to apply these emulsions in a controlled manner onto the yarn, and/or the guide rollers which are used to guide the yarn through the process were quickly filled with deposits that urged the process to be stopped and the guide rollers to be cleaned.

According to another process for the application of superabsorbent materials, in WO 9910591 an aqueous solution of a water-soluble pre-superabsorbent material was applied onto the yarn followed by drying and heating of the yarn in order to cross-link or to polymerize the water-soluble pre-superabsorbent material to obtain a yarn provided with the superabsorbent material. This method has also the disadvantage that a drying step is used after the application of the superabsorbent material, and moreover a heating step is necessary to obtain cross-linking of the material.

In WO 00/31752 a fiber has been described that is coated with a water-blocking material that includes an essentially water free dispersion comprising a superabsorbent polymer and a dispersing medium. This method does not make use of a water-in-oil emulsion, but of superabsorbent material dispersed in an oil. The oils used are not saturated hydrocarbons but esteroil lubricants composed of an alcohol and a carboxylic acid, in general having less than 20 carbon atoms. This method was developed to obtain a simpler application to yarn than with using water-in-oil based water-blocking materials. This method however, appears unfavorable with regard to the poor stability of these dispersions and health risks of working with fine respirable superabsorbent particles of deposit forming onto the guide rollers and the like.

It is therefore an objective of the present invention to provide a method for applying superabsorbent material onto a yarn without the need of performing additional process steps after the application of the superabsorbent material on the yarn and without forming deposits, or at least severely diminishing forming of deposits, on the guide rollers or other parts of the production line.

The term "guide roller" as used throughout this description includes guide rollers, bail rollers, pressure rollers, guiding rods, pins, winders, and the like.

To this end the invention relates to a method for preventing or reducing deposit forming of superabsorbent material and/or oil onto guide rollers during the process of applying a superabsorbent water-in-oil emulsion onto a yarn wherein the oil is a mixture comprising saturated hydrocarbons, characterized in that the at least 70 wt % of the hydrocarbons have 20 to 32 carbon atoms. It is preferred to use an oil wherein at least 75 wt % of the hydrocarbons have 20 to 32 carbon atoms, and most preferred at least 79 wt % have said hydrocarbons.

The method of the invention allows using this water-in-oil emulsion directly on-line on a yarn. Thus yarn obtained from a spinning process can directly be treated by this water-in-oil emulsion, without first winding the yarn onto a bobbin. No drying or heating steps are necessary after the application of the superabsorbent-containing emulsion, and the yarn is wound to a bobbin at the end of the process. Prior to application of the water-in-oil emulsion the yarn may be completely or partially dried. The term "on-line" means that the yarn is used as spun without being wound onto a bobbin, reel, spool, or the like. The method further allows using high process speeds.

Yarn speed may be at least 220 m/min, but much higher speeds, such as 600 m/min are also possible.

The method can be used for any multifilament yarn, and is particularly suitable for aramid and glass yarn.

Superabsorbent materials have been described in EP 779389. These materials have hydrophilic properties and are capable of absorbing and retaining a comparatively large quantity of water, optionally under pressure. So, the materials to be applied according to the present invention include, in addition to the insoluble super-absorbents mentioned on p. 198 of P. K. Chatterjee, ed's Absorbency, Elsevier, Amsterdam (1985) and in European Patent Application 0 351 100, superabsorbent materials that are wholly or partially water-soluble. Although the aramid yarn according to the invention may be provided with any material having superabsorbent properties, preference is given to those superaborbents which can be processed into stable water-in-oil emulsions. Particularly suitable for use are superabsorbent derivatives of polyacrylic acid. These include the homopolymers and copolymers derived from acrylamide, from acrylamide and sodium acrylate, and from acrylamide and dialkylaminoethyl methacrylate. These compounds are selected from the groups of non-ionic, anionic, and cationic (co)polymers, respectively. They are generally prepared by linking the monomer units to form a water-soluble polymer. This can then be rendered insoluble by means of ionic and/or covalent cross-linking. Examples of superabsorbents that can be used in the manufacture of the yarns according to the invention include: cross-linked polyacrylic acid partially neutralized into the sodium salt, polypotassium acrylate, copolymers of sodium acrylate and acrylamide, terpolymers of acrylamide and carboxyl groups and sulfo group-containing monomers (sodium salt), and polyacrylamide copolymers.

Preferably, use is made of a terpolymer of acrylamide and carboxyl group- and sulfo group-containing monomers (sodium salt) or of a copolymer of acrylamide and acrylic acid or (sodium or potassium) salt thereof. The yarns of the invention are made using a process wherein on the aramid yarn surface there is provided a layer of a water-in-oil emulsion containing in its aqueous phase a material having superabsorbent properties, and that no further drying treatment is necessary. The superabsorbent-containing water-in-oil emulsion remains unchanged on the yarn. When this emulsion is contacted with water it inverts to an oil-in-water emulsion thereby forming a highly viscous gel. This gel prevents water to penetrate into a damaged yarn or cable.

The preparation of such an emulsion is as follows: using an emulsifier a water-soluble monomer admixed with a quantity of water is dispersed in a non-polar solvent immiscible with water and the monomer, and then polymerized to form a water-in-oil emulsion. The polymer formed is in the aqueous phase of the emulsion. The water content of the emulsion can be lowered by a vacuum treatment of the prepared emulsion.

In this manner a liquid product is obtained which contains highly concentrated superabsorbent while the liquid's viscosity remains low and the amount of volatile components in the emulsion can be reduced. As continuous oil phase of the emulsion can be used linear and branched hydrocarbons which are immiscible or poorly miscible with water. Preferably, saturated linear or branched aliphatic hydrocarbons are used. The hydrocarbons mainly constitute of molecules having 20 to 32 carbon atoms. Smaller hydrocarbons can be present, up to 30% by weight, preferably less than 20% by weight. It was found that the best results were obtained using mixtures containing as less as possible of hydrocarbons having less than 20 carbon atoms, more preferably as less as possible of hydrocarbons having less than 23 carbon atoms. The hydrocarbons, in large majority containing 20 to 32 carbon atoms, may be pure unbranched or branched hydrocarbons, but usually are mixtures of both branched and unbranched hydrocarbons of various lengths. Suitable hydrocarbons are commercially available under various trade names at manufactures such as Shell Lubricants, Ineos, Dow, Exxon Mobile, Chevron Phillips, Total, British Petrol and LubLine. These hydrocarbons can also be used as a diluent to reduce the viscosity of the water-in-oil emulsion. An example of a suited branched and saturated hydrocarbon is Isoeicosane of Ineos. The ready-to-use emulsions are available at various manufacturers, such as Ashland, Cytec, Defotec, Bozzetto, Nalco, and Drew Chemical.

The emulsifiers employed are selected such that said mixture can be converted into a water-in-oil emulsion. This means that the emulsifier should have an HLB (hydrophile-lipophile balance) value of 3-12. The concentration of superabsorbent material in the emulsion used according to the invention is 1-90%, preferably 25-65% calculated on the overall weight of the emulsion.

Further additives, such as lubricants, stabilizers, emulsifiers, and/or diluents may be added to the emulsion.

The amount of superabsorbent-containing water-in-oil emulsion on the yarn is selected such that favorable water blocking properties are obtained when the yarn is used in cables. Favorable results are usually obtained if the yarn contains 0.3-10 wt %, preferably 0.5-8% wt %, and more particularly 1.0-5.0 wt % of the emulsion.

In the process for obtaining the yarns according to the invention the water-in-oil emulsion can be applied using a method known in itself, e.g. via a kiss roll, a liquid applicator, or a finishing bath.

The invention is illustrated by the following non-limitative example.

EXAMPLE

An aramid spinning mass was prepared by mixing concentrated (99.8 wt %) sulfuric acid ice with powdered poly-p-phenylene terephthalamide. The spinning mass was de-aerated, heated to 85-90° C. in a kneader mixer melter and fed to a spinneret via a filter and a spinning pump. The spinneret had 1000 orifices of 59 micrometer in diameter. The spinning mass was pumped through the spinning orifices and thereafter successively passed through an air zone of 6 mm in length and a coagulation bath of a dilute solution of sulfuric acid in water (about 18% by weight) at a temperature of 10° C. The filament bundle thus formed successively passed through a neutralization bath containing a dilute sodium hydroxide solution and a washing bath in which the filaments were thoroughly washed with water of about 70° C. Excess adhering water was removed with the aid of a pair of squeeze rollers. Next the non-dried bundle of filaments was provided with 0.8% of a non-ionic spin finish (from a 15 wt % aqueous solution) with the aid of a liquid applicator and a dosing pump. Then the yarn was passed over a series of 3 drying drums (6 wraps of 160° C., 6 wraps of 200° C., 4 wraps of 230° C.). The contact time of the yarn with the surface of the drums was 6-7 seconds in total. Subsequently, the yarn was passed over a transport drum (4 wraps of about 25° C.). Directly after the transport drum, a superabsorbent-containing water-in-oil emulsion (see Table) was applied onto the yarn with the aid of a liquid applicator and a dosing pump. Finally the treated yarn was wound into a package at a speed of 340 m/min. The Twaron® yarn obtained had a linear density of 1610 dtex.

The results are given in the Table:

|  | Superabsorbent-containing water-in-oil emulsions | | | |
|  | Invention | | comparative | |
|  | 1 | 2 | A | B |
| --- | --- | --- | --- | --- |
| dosed amount on Twaron ® yarn (%) | 3 | 3 | 3 | 3 |
| spinning/yarn speed (m/min) | 340 | 340 | 340 | 340 |
| maximum production run time (h) | >19 | >21 | <2.5 | <0.5 |
| deposit formation on guide rollers and/or bail roller | almost none | almost none | severe | severe |
| wt % C20-C32 aliphatic linear and branched hydrocarbons | 79 | 81 | 8 | 1 |
| wt % water in emulsion | 3 | 3 | 27 | 41 |

The Table shows that hydrocarbons having predominantly C20-C32 hydrocarbons (Isoeicosane, ex Ineos) give no (or almost no) deposits on the guide rollers, allowing production run times of more than 19 hours. Conventional hydrocarbon emulsions (examples A and B; Drewfloc 2585, ex Ashland Specialty Chemical Company, Barendrecht, Netherlands, and Estesol AFW, ex Bozzetto GmbH, Krefeld, Germany, respectively), containing low molecular weigh hydrocarbons, show severe deposits onto the guide rollers, making production run times longer than a few hours impossible. Frequent cleaning was necessary to continue the process. The high molecular hydrocarbons of the invention (examples 1 and 2) could be made with very low water contents (contents less than 10 wt %, preferably less than 8 wt %, most preferably less than 5 wt % is possible). Thus drying after application is not longer necessary.

The invention claimed is:

1. A method for preventing or reducing deposit forming of superabsorbent material and/or oil onto guide rollers during the process of applying a superabsorbent water-in-oil emulsion onto a yarn, the oil being a mixture comprising saturated hydrocarbons, wherein at least 70 wt % of the saturated hydrocarbons have 20 to 32 carbon atoms.

2. The method according to claim 1, wherein at least 75 wt % of the hydrocarbons have 20 to 32 carbon atoms.

3. The method according to claim 1, wherein at least 79 wt % of the hydrocarbons have 20 to 32 carbon atoms.

4. The method according to claim 1, wherein the method is further applied on-line to a yarn that is directly obtained from a spinning process.

5. The method according to claim 4, wherein the yarn speed is at least 220 m/min.

6. The method according to claim 1, wherein the yarn is an aramid yarn or a glass yarn.

7. The method according to claim 2, wherein the method is further applied on-line to a yarn that is directly obtained from a spinning process.

8. The method according to claim 3, wherein the method is further applied on-line to a yarn that is directly obtained from a spinning process.

9. The method according to claim 7, wherein the yarn speed is at least 220 m/min.

10. The method according to claim 8, wherein the yarn speed is at least 220 m/min.

11. The method according to claim 2, wherein the yarn is an aramid yarn or a glass yarn.

12. The method according to claim 3, wherein the yarn is an aramid yarn or a glass yarn.

13. The method according to claim 4, wherein the yarn is an aramid yarn or a glass yarn.

14. The method according to claim 7, wherein the yarn is an aramid yarn or a glass yarn.

15. The method according to claim 8, wherein the yarn is an aramid yarn or a glass yarn.

16. The method according to claim 5, wherein the yarn is an aramid yarn or a glass yarn.

17. The method according to claim 9, wherein the yarn is an aramid yarn or a glass yarn.

18. The method according to claim 10, wherein the yarn is an aramid yarn or a glass yarn.

* * * * *

UNITED STATES PATENT AND TRADEMARK OFFICE
CERTIFICATE OF CORRECTION

| | | |
|---|---|---|
| PATENT NO. | : 8,003,029 B2 | Page 1 of 1 |
| APPLICATION NO. | : 12/450037 | |
| DATED | : August 23, 2011 | |
| INVENTOR(S) | : Hans Jansen et al. | |

It is certified that error appears in the above-identified patent and that said Letters Patent is hereby corrected as shown below:

Column 3, line 20 change "manufactures" to --manufacturers--.

Column 4, line 38 change "weigh" to --weight--.

Signed and Sealed this
Twenty-second Day of November, 2011

David J. Kappos
*Director of the United States Patent and Trademark Office*